US007005978B2

(12) United States Patent
Takeuchi et al.

(10) Patent No.: US 7,005,978 B2
(45) Date of Patent: Feb. 28, 2006

(54) VEHICLE DIRECTION INDICATION DEVICE WITH FLASH RATE THAT DOES NOT APPEAR TO CHANGE WHEN BATTERY VOLTAGE VARIES

(75) Inventors: Takahiro Takeuchi, Anjo (JP); Hirofumi Mokuya, Kariya (JP); Yoshichika Abe, Anjo (JP)

(73) Assignees: Anden Co., Ltd., Anjo (JP); Denso Corporation, Kariya (JP)

( * ) Notice: Subject to any disclaimer, the term of this patent is extended or adjusted under 35 U.S.C. 154(b) by 72 days.

(21) Appl. No.: 10/701,420

(22) Filed: Nov. 6, 2003

(65) Prior Publication Data

US 2004/0178904 A1 Sep. 16, 2004

(30) Foreign Application Priority Data

Nov. 8, 2002 (JP) ............................ 2002-325462

(51) Int. Cl.
*B60Q 1/34* (2006.01)

(52) U.S. Cl. ...................... 340/475; 315/224; 340/331; 340/815.45

(58) Field of Classification Search ................ 340/475, 340/815.4, 815.45, 331; 315/224
See application file for complete search history.

(56) References Cited

U.S. PATENT DOCUMENTS 6,586,890 B1 * 7/2003 Min et al. ................... 315/224

FOREIGN PATENT DOCUMENTS

JP 2001-315572 11/2001

* cited by examiner

*Primary Examiner*—Thomas Mullen
(74) *Attorney, Agent, or Firm*—Posz Law Group, PLLC

(57) ABSTRACT

A vehicle direction indication device is configured such that a voltage of a battery power supply is detected, and when a direction indication light switch is switched to ON, a pulse width modulated signal is output. This pulse width modulated signal is generated by pulse width modulating a flash signal for driving a direction indication light in a flashing manner with a duty ratio based upon the detected voltage of the battery power supply; the duty ratio at which the voltage of the battery power supply is high becomes smaller than that at which the voltage of the battery power supply is low. The direction indication light is then driven in the flashing manner based upon the output signal.

5 Claims, 6 Drawing Sheets

VEHICLE DIRECTION INDICATION DEVICE WITH FLASH RATE THAT DOES NOT APPEAR TO CHANGE WHEN BATTERY VOLTAGE VARIES

CROSS REFERENCE TO RELATED APPLICATION

This application is based upon and claims the benefit of Japanese Patent Application No. 2002-325462 filed on Nov. 8, 2002, the content of which are incorporated herein by reference.

FIELD OF THE INVENTION

The present invention relates to a vehicle direction indication device in which a change in an appearance of a flash rate caused by flickers resulting from variation in a battery voltage is inhibited.

RELATED ART OF THE INVENTION

Conventionally, as a vehicle direction indication device, art is often utilized in which a direction indication lamp is driven in a flashing manner by directly supplying current to direction indication lamp from a battery supply.

Moreover, recently, as a result of the promotion of power saving for vehicles, the use of art provided with a low power-consumption light-emitting diode (hereinafter referred to as "LED") as a vehicle direction indication light has been investigated.

In the case that a lamp is adopted as the direction indication light the filament gradually emits light as its temperature increases when current flows in a filament; and the light of the filament is gradually extinguished when current flow in the filament is interrupted. A turn-on time until a stable light-emitting state is reached following the start of current supply is around 300 ms, and a turn-off time until the light is completely extinguished following interruption of the current supply is around 100 ms. Accordingly, a light emission amount of the lamp changes in a slowly responsive manner.

In contrast to this, when an LED is used as the direction indication light, the turn-on time and the turn-off time are around 1 ms to 2 ms, respectively. Thus, the light emission amount of the LED changes in a highly responsive manner.

A voltage of the battery supply varies during vehicle braking operation, or the like. Accordingly, in the case that the lamp is used, if the voltage of the battery supply varies during operation of the direction indication light, the light emission amount of the lamp does not respond to the variation in the voltage of the battery supply; thus, flickering does not occur. However, in the case that the LED is used, the light emission amount of the LED responds to the variation in the voltage of the battery supply, and thus flickering occurs. As a result of this flickering, a flash rate of the direction indication light appears to change.

SUMMARY OF THE INVENTION

The present invention takes into consideration the above described problems; it is an object of the present invention to provide a direction indication light utilizing an LED in which a flash rate of the direction indication light does not appear to change as a result of variation in a voltage of a battery supply.

In order to achieve this object, the present invention is configured such that a voltage of a battery power supply is detected, and when a direction indication light switch is switched to ON, a pulse width modulated signal is output. This pulse width modulated signal is generated by modulating a pulse width of a flash signal for driving a direction indication light in a flashing manner with a duty ratio based upon the detected voltage of the battery power supply; this duty ratio becomes smaller when the voltage of the battery power supply is high as compared to when the voltage of the battery power supply is low. The direction indication light is then driven in the flashing manner based upon the output signal.

In this way, the direction indication light is driven in the flashing manner by the pulse width modulated signal formed by modulating the pulse width of the flash signal based upon the voltage of the battery power supply. Accordingly, even if the voltage of the battery power supply varies, a light emission amount of an LED is set at a constant, enabling the generation of flickering to be inhibited. Thus, it is possible to make it appear as though there is no change in a flash rate of the direction indication light.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
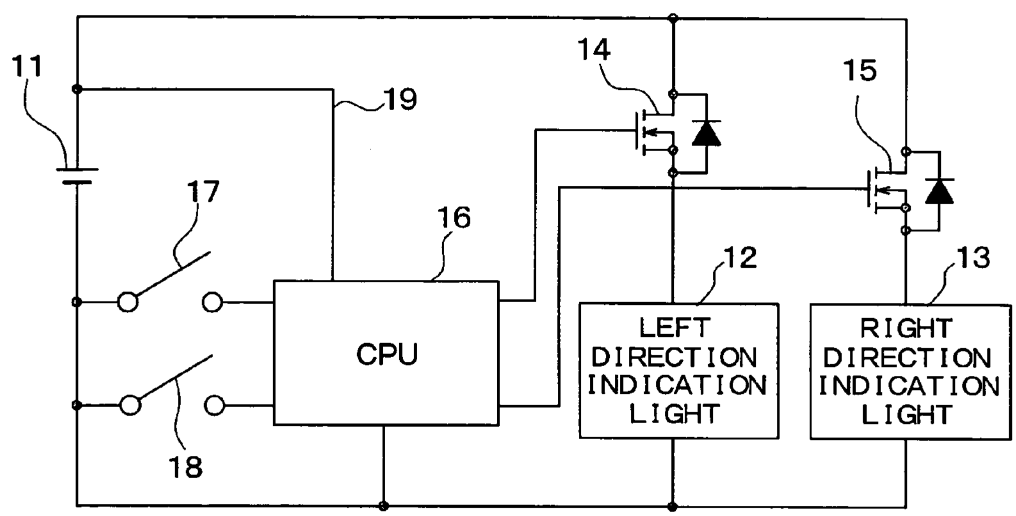
FIG. 1 shows a circuit configuration of a direction indication device according to a first embodiment of the present invention.

The present invention will be described further with reference to various embodiments in the drawings.

(First Embodiment)

FIG. 1 shows a configuration of a direction indication device according to a first embodiment of the present invention. As shown in FIG. 1, the direction indication device is configured as a so-called double relay type in which respective direction indication lights are driven using two direction indication light drive circuits.

Figure 2:
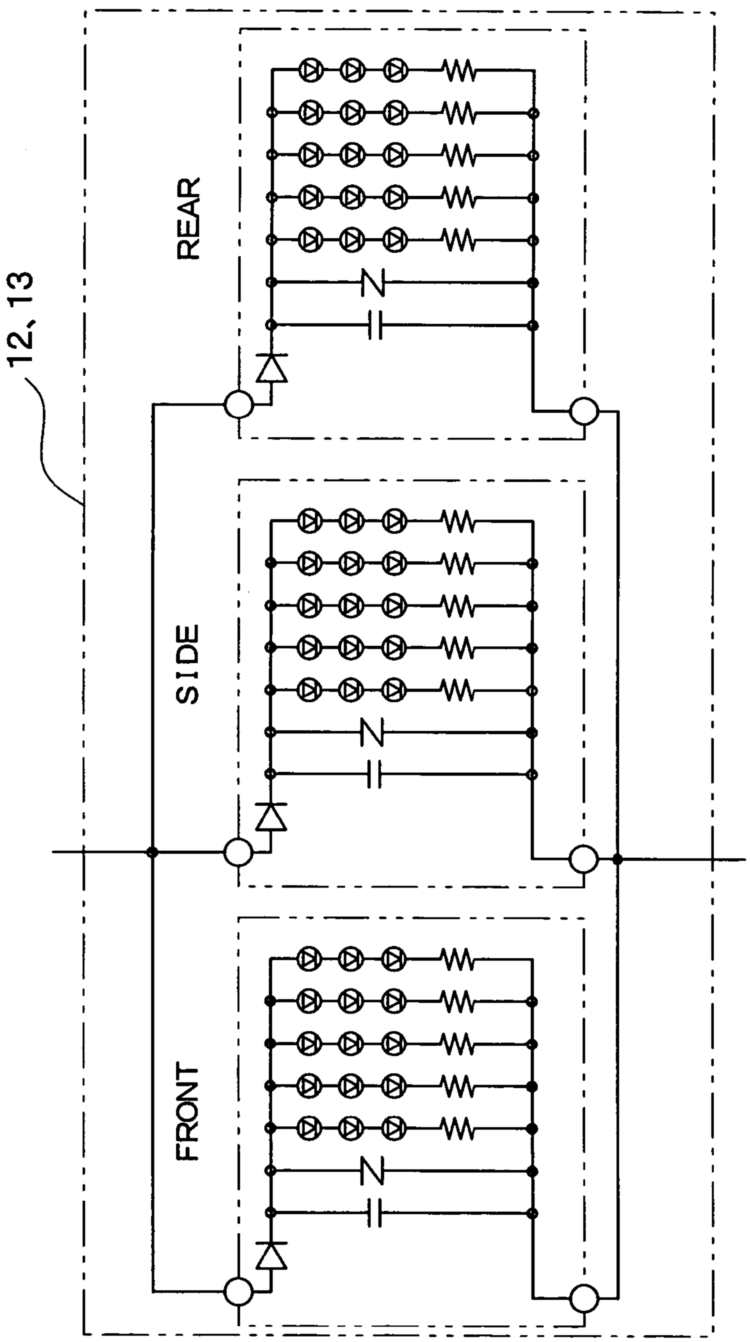
FIG. 2 shows a configuration of a direction indication light according to the first embodiment.

A left direction indication light 12 and a right direction indication light 13 for the left and right sides of a vehicle, not shown, are respectively configured, as shown in FIG. 2, from front, side and rear direction indication lights that are each configured from a plurality of LEDs. Further, the left direction indication light 12 and the right direction indication light 13 are connected to a battery power supply 11 via a left direction indication light driving FET 14 and a right direction indication light driving FET 15, respectively.

ON/OFF control of the direction indication light driving FETs 14 and 15 is executed by a CPU 16. The CPU 16 detects a voltage of the battery power supply 11 via a power supply voltage detection line 19 connected to the battery power supply 11; when a left direction indication light switch 17 or a right direction indication light switch 18 is switched to ON, a flash signal for driving the left direction indication light 12 or the right direction indication light 13 in a flashing manner is output to the left direction indication light driving FET 14 or the right direction indication light driving FET 15, respectively. This flash signal is a signal in which a pulse width is modulated based upon the voltage of the detected battery power supply so that a duty ratio thereof at which the voltage of the battery power supply is high becomes smaller than that at which the voltage of the battery is low.

Figure 3:
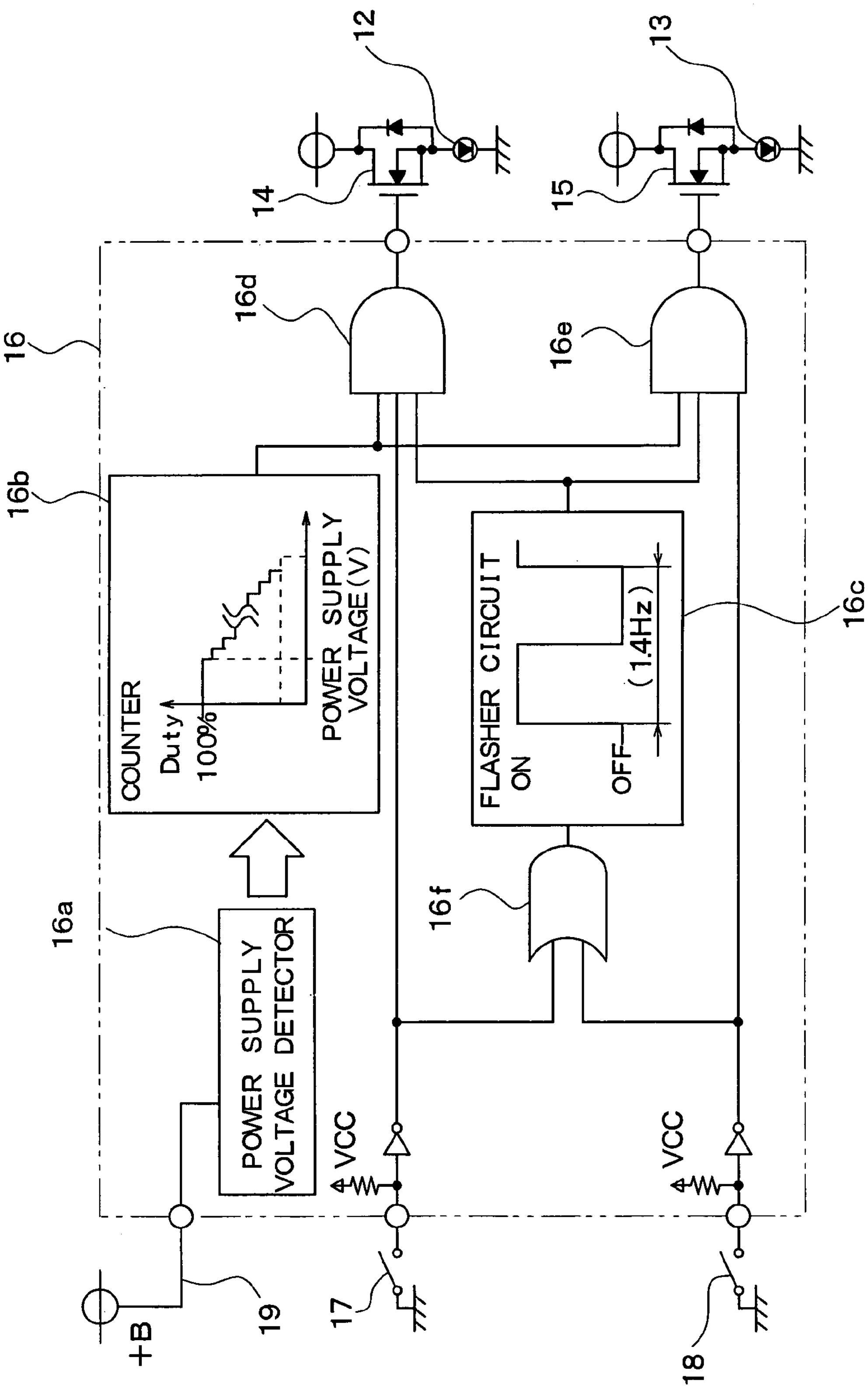
FIG. 3 shows a circuit configuration of a CPU according to the first embodiment.

The CPU 16 is configured from a custom IC. FIG. 3 shows the detailed configuration of this CPU 16. As shown in FIG. 3, the CPU 16 is configured from a power supply voltage detection circuit 16*a*, a counter circuit 16*b*, a flasher circuit 16*c*, AND circuits 16*d* and 16*e*, and an OR circuit 16*f*, and the like.

The power supply voltage detection circuit 16*a* has an A/D converter and executes A/D conversion of the voltage (+B) of the battery power supply 11 input via the power supply voltage detection line 19 at a predetermined resolution. A digital signal (hereinafter referred to as "area number") that accords with the voltage of the battery power supply 11 is then output from the power voltage supply circuit 16*a*.

The counter circuit 16*b* is configured so as to generate and output a pulse signal with a duty ratio in accordance with the area number which is input from the power supply voltage detection circuit 16*a* at fixed time intervals.

Figure 4:
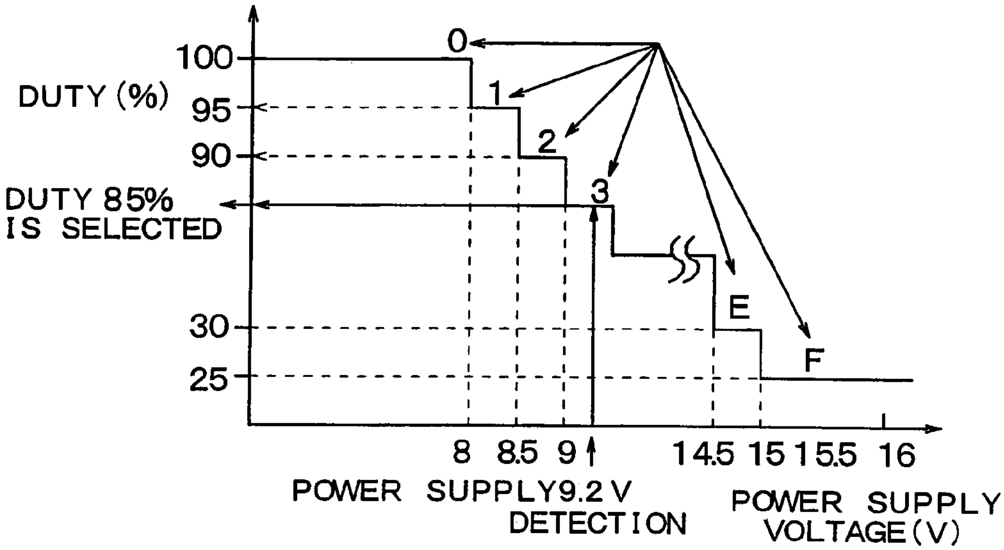
FIG. 4 is an explanatory graph of an operation of a counter circuit according to the first embodiment.

Next, the operation of the counter circuit 16*b* will be explained with reference to FIG. 4. As shown in FIG. 4, the A/D conversion resolution of the power supply voltage detection circuit 16*a* is set to 16 bits; hexadecimal numerals, i.e., 0, 1, 2, . . . , F, in 0.5V increments are assigned for the area number, in accordance with the voltage of the battery power supply 11. Further, the pulse signal with the duty ratio that accords with the area number is output from the counter circuit 16*b*.

More specifically, the counter circuit 16*b* is reset at fixed time intervals. Following resetting, the counter circuit 16*b* begins to count upwards in synchronization with a clock, not shown, and at the same time, outputs a high level signal. When the count number becomes the same as the area number, a low level signal is output, whereby a pulse signal with a duty ratio that accords with the area number is generated and output. Accordingly, as shown in the example of FIG. 4, when the voltage of the battery power supply 11 is lower than 8V, 0 is output from the power supply voltage detection circuit 16*a* as the area number; thus, a pulse signal for a 100% duty ratio that accords with the area number is output from the counter circuit 16*b*. Further, when the voltage of the battery power supply 11 is 9.2V, 3 is output from the power supply voltage detection circuit 16*a* as the area number; thus, a pulse signal with an 85% duty ratio that accords with the area number is output from the counter circuit 16*b*.

Figure 5A:
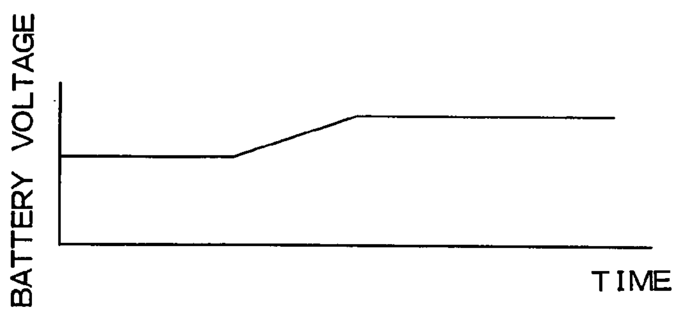
FIG. 5 is a graph showing a relationship of a voltage of a battery power supply and a duty ratio of a pulse signal.
Figure 5B:
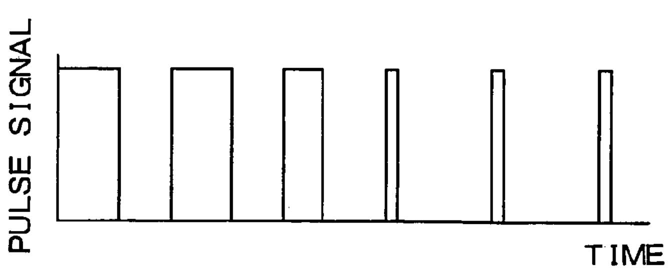

Accordingly, as shown in FIGS. 5A and 5B, when the voltage of the battery power supply 11 is low, the duty ratio of the pulse signal output from the counter circuit 16*b* is large; as the voltage of the battery power supply 11 increases, the duty ratio of the pulse signal output from the counter circuit 16*b* becomes smaller.

The pulse signal output from the counter circuit 16*b* is input to the AND circuits 16*d* and 16*e*. Moreover, when the left direction indication light switch 17 or the right direction indication light switch 18 is switched to ON, a signal indicating the switching-on operation is input to the AND circuits 16*d* and 16*e*, and at the same time, to the flasher circuit 16*c* via the OR circuit 16*f*. The flasher circuit 16*c* starts operation as a result of receiving the signal indicating the switching-on operation, which is input via the OR circuit 16*f*, and generates and outputs a flash signal with a frequency of around 1.4 Hz and a duty ratio of approximately 50%. This flash signal is input to the AND circuits 16*d* and 16*e*.

Accordingly, when the left direction indication light switch 17 or the right direction indication light switch 18 are switched to ON, the AND circuits 16*d* and 16*e* output, while the flash signal from the flasher circuit 16*c* is ON, a signal with a duty ratio that accords with the voltage of the battery power supply 11. In other words, the flash signal in which the pulse width is modulated is output.

Moreover, pulse width modulation control of the direction indication light driving FET 14 or the direction indication light driving FET 15 is executed by the signal output from the CPU 16. The cycle at which the signal is input to respective gate terminals of the direction indication light driving FETs 14 and 15 is a short time period that makes the left direction indication light 12 and the right direction indication light 13 appear to flash.

Next, an operation of the direction indication device with the above described configuration will be explained.

The power supply voltage detection circuit 16*a* of the CPU 16 executes A/D conversion of the voltage of the battery power supply 11, and outputs the area number according with the voltage of the battery power supply 11. The counter circuit 16*b* generates the pulse signal with the duty ratio that accords with the area number input from the power supply voltage detection circuit 16*a* at the fixed time intervals.

It should be noted that when the left direction indication light switch 17 and the right direction indication light switch 18 are switched to OFF, the output from the AND circuits 16*d* and 16*e* becomes the low level output. Therefore, in this case, flash control of the direction indication lights 12 and 13 by the CPU 16 is not executed.

Subsequently, when the left direction indication light switch 17 or the right direction indication light switch 18 is switched to ON by the driver, the signal indicating the switching-on operation is input to the AND circuits 16*d* and 16*e*. Further, as a result of this signal indicating the switching-on operation, the flasher circuit 16*c* starts to operate, and the flash signal from the flasher circuit 16*c* is input to the AND circuits 16*d* and 16*e*. As a result, the flash signal modulated in the pulse width is output from the AND circuits 16*d* and 16*e*. This signal is input to the respective gate terminal of the direction indication light driving FET 14 or the direction indication light driving FET 15. Then, the left direction indication light 12 or the right direction indication light 13 is driven in the flashing manner by the direction indication light driving FET 14 or the direction indication light driving FET 15

Note that, even if the voltage of the battery power supply 11 varies during the operation of the direction indication light, the duty ratio of the pulse signal output from the counter circuit 16*b* changes in accordance with the voltage variation; when the voltage of the battery power supply 11 is high, the duty ratio of the pulse signal becomes smaller; when the voltage of the battery power supply 11 is low, the duty ratio of the pulse signal becomes larger. Accordingly, as the voltage of the battery power supply 11 increases, the light emission period of the LED per unit-time becomes shorter; as the voltage of the battery power supply 11 decreases, the light emission period of the LED per unit-time becomes longer.

Accordingly, even when an LED is used for the direction indication light, it is possible to fix the light emission amount of the LED configuring the direction indication light irrespective of variation in the voltage of the battery power supply 11, by driving the direction indication light using the flash signal in which the pulse width is modulated with the duty ratio that accords with the voltage of the battery power supply 11.

Thus, it is possible to inhibit flickering of the direction indication light, and it is possible to address the problem of the flash rate of the direction indication light appearing to change.

(Second Embodiment)

Figure 6:
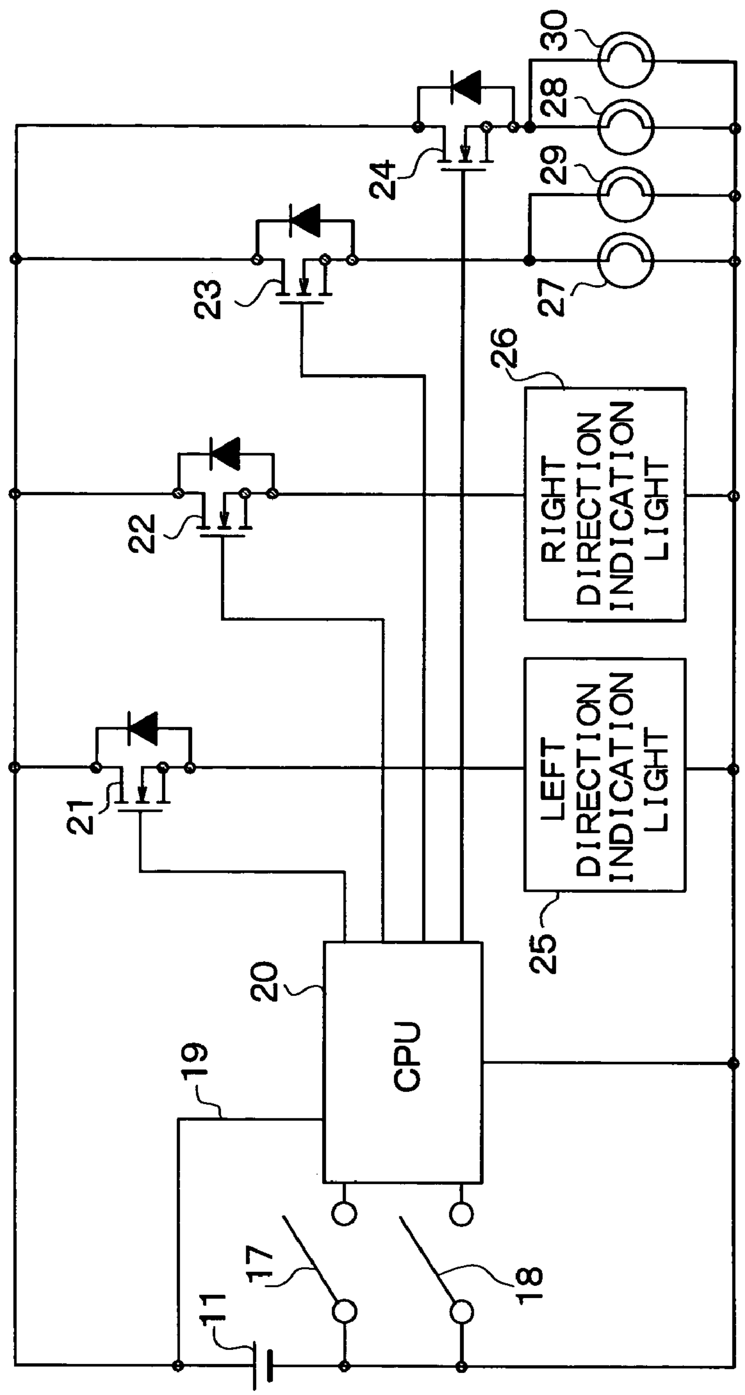
FIG. 6 shows a circuit configuration of a direction indication device according to a second embodiment of the present invention.

FIG. 6 shows a configuration of a direction indication device according to a second embodiment of the present invention. An explanation has been given concerning the double relay type direction indication device of the first embodiment. However, the direction indication device of the second embodiment is configured as a so-called four relay type in which respective direction indication lamps are driven using four direction indication light drive circuits. Moreover, in the second embodiment, lamps are used for direction indication lights 27 and 28 of the left and right front of the vehicle, respectively, and are also used for direction indication lights 29 and 30 of the left and right sides of the vehicle, respectively. LEDs are used for the direction indication lights 25 and 26 of the left and right rear of the vehicle, respectively.

The left rear direction indication light 25 and the right rear direction indication light 26 are configured from a plurality of LEDs, in the same manner as the rear direction indication light shown in FIG. 2, and are driven by a FET 21 and a FET 22, respectively. In addition, the left front direction indication light 27 and the left side direction indication light 29 are driven by a FET 23, and the right front direction indication light 28 and the right side direction indication light 30 are driven by a FET 24.

A CPU 20 controls the FETs 21 and 23 in accordance with the left direction indication light switch 17 being switched to ON; and controls the FETs 22 and 24 in accordance with the right direction indication light switch 18 being switched to ON. In this case, due to the configuration being the same as that shown in FIG. 3, the CPU 20 outputs a flash signal modulated in a pulse width to execute pulse width modulation control for the FETs 21 and 22; and outputs the flash signal from the flasher circuit 16*c* without change to execute ON/OFF control of the FETs 23 and 24.

With the above described configuration, even when the lamps and the LEDs are used as the direction indication lights, it is possible to inhibit the generation of flickering of the direction indication lights using the LEDs by executing pulse width modulation control, using the pulse signal with the duty ratio that accords with the voltage of the battery power supply 11.

(Third Embodiment)

Figure 7:
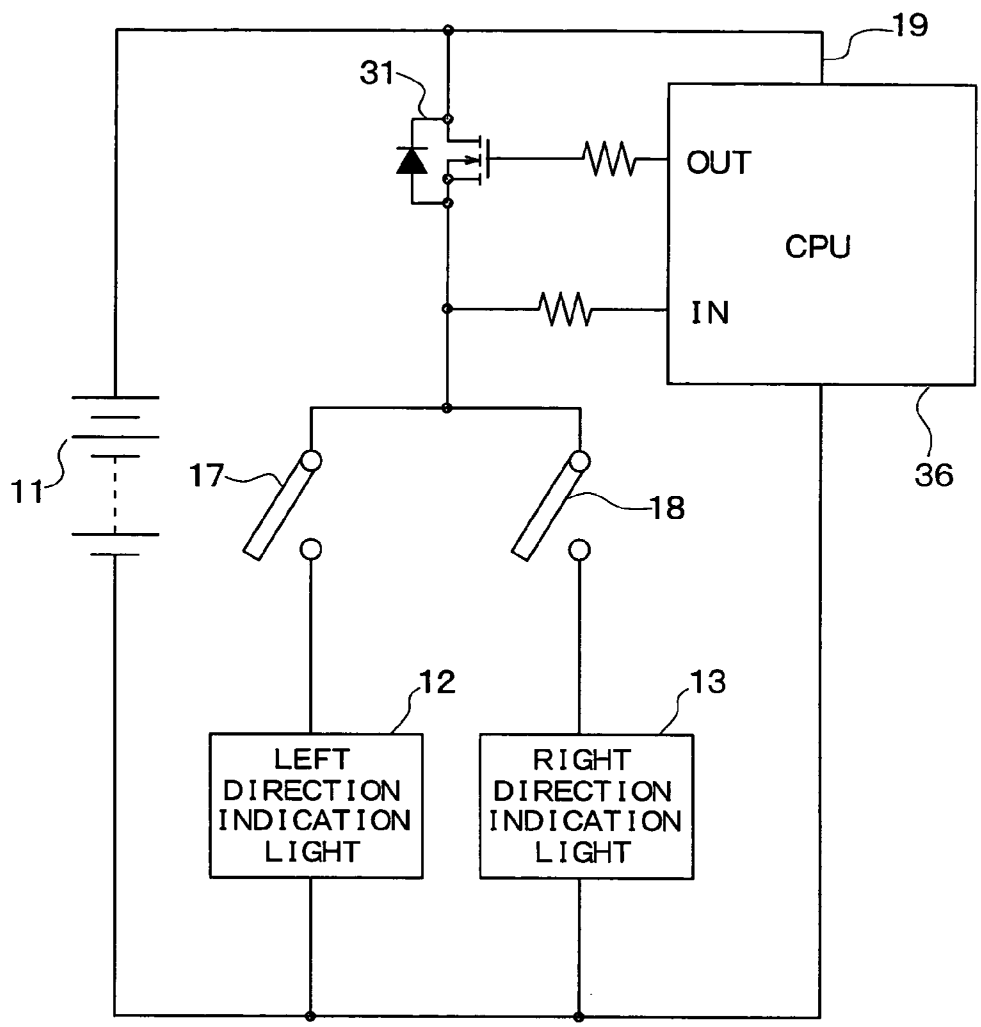
FIG. 7 shows a circuit configuration of a direction indication device according to a third embodiment of the present invention.

FIG. 7 shows a configuration of a direction indication device according to a third embodiment of the present invention. The third embodiment is configured as a so-called single relay type in which a plurality of direction indication lamps are driven using one direction indication light drive circuit. Note that the left direction indication light 12 and the right direction indication light 13 are, like those of the first embodiment, configured from the front, the side and the rear direction indication lights that are each configured from the plurality of LEDs.

A CPU 36 has an input terminal IN and an output terminal OUT. When it is detected that a level of the input terminal IN has become low due to the left direction indication light switch 17 or the right direction indication light switch 18 being switched to ON, flash signal modulated in a pulse width is output to the output terminal OUT, and pulse width modulation control of the FET 31 is executed.

Moreover, the circuit configuration that outputs the flash signal by detecting that a level of the input terminal IN has become low when either the left or right direction indication light switches 17 or 18 is switched to ON is well known. Accordingly, the CPU 36 is configured by adding the power supply voltage detection circuit, the counter circuit and the AND circuit shown in FIG. 3, to the well known circuit, such that the flash signal that is modulated in a pulse width is output based on the logical AND of the pulse signal output from the counter circuit and the flash signal is output.

(Other Embodiments)

In each of the above described embodiments, the CPU 16, which configures a control unit, is configured from the custom IC including the power supply voltage detection circuit 16*a* that corresponds to a power supply voltage detection unit; the counter circuit 16*b* that corresponds to a pulse signal generation unit; the flasher circuit 16*c* that corresponds to a flash signal generation unit; and the AND circuits 16*d* and 16*e* that correspond to a logical AND operation unit. However, the CPU 16 may be configured so as to operate in accordance with a computer program.

In addition, in the above described embodiments, the power supply voltage detection circuit 16*a* incorporated in the respective CPUs 16, 20 and 36 is used as the power supply voltage detection unit. However, the power supply voltage detection circuit 16*a* may be provided outside of the respective CPUs 16, 20 and 36.

Further, in the above described embodiments, the counter circuit 16*b* was utilized as the pulse signal generation unit that generates the pulse signal with the duty ratio that accords with the voltage of the power supply. However, a circuit unit that stores the relationship of the voltage of the power supply and the duty ratio as a map as shown in FIG. 4, and uses the map to generate the pulse signal with the duty ratio that accords with the voltage of the power supply may be adopted.

In addition, as a drive unit for driving the direction indication light in the flashing manner, an electromagnetic relay, or the like, may be used, instead of using a solid state switch like the FET.

While the above description is of the preferred embodiments of the present invention, it should be appreciated that the invention may be modified, altered, or varied without deviating from the scope and fair meaning of the following claims.

What is claimed is:

1. A vehicle direction indication device that drives a direction indication light configured with a light emitting diode in a flashing manner, as a result of switching of a direction indication light switch, comprising:

a control unit that detects a voltage of a battery power supply, and outputs a signal generated by pulse width modulating a flash signal for driving the direction indication light in the flashing manner with a duty ratio based upon the detected voltage of the battery power supply when the direction indication light switch is switched on, the duty ratio at which the voltage of the battery power supply is high being smaller than that at which the voltage of the battery power supply is low; and a drive unit that drives the direction indication light in the flashing manner due to application of the voltage of the battery power supply to the direction indication light, as a result of the signal output by the control unit, wherein the duty ratio is one hundred percent when the voltage of the battery power supply is equal to or below a predetermined voltage, and the duty ratio is set so as to become smaller in a step-like manner as the voltage of the battery power supply increases above the predetermined voltage.

2. A vehicle direction indication device that drives a direction indication light configured with a light emitting diode in a flashing manner, as a result of switching of a direction indication light switch, comprising:

a control unit that detects a voltage of a battery power supply, generates a pulse signal with a duty ratio based upon the detected voltage of the battery power supply, the duty ratio at which the voltage of the battery power supply is high being smaller than that at which the voltage of the battery power supply is low, generates a flash signal for driving the direction indication light in the flashing manner, and outputs a signal that is generated based on an AND logic of the pulse signal and the flash signal when the direction indication light switch is switched on; and a drive unit that drives the direction indication light in the flashing manner due to application of the voltage of the battery power supply to the direction indication light, as a result of the signal output by the control unit, wherein the duty ratio is one hundred percent when the voltage of the battery power supply is equal to or below a predetermined voltage, and the duty ratio is set so as to become smaller in a step-like manner as the voltage of the battery power supply increases above the predetermined voltage.

3. A vehicle direction indication device that drives a direction indication light configured with a light emitting diode in a flashing manner, as a result of switching of a direction indication light switch, comprising:

a control unit that detects a voltage of a battery power supply, generates a pulse signal with a duty ratio based upon the detected voltage of the battery power supply, the duty ratio at which the voltage of the battery power supply is high being smaller than that at which the voltage of the battery power supply is low, generates a flash signal for driving the direction indication light in the flashing manner, and outputs a signal that is generated based on an AND logic of the pulse signal and the flash signal when the direction indication light switch is switched on; and a drive unit that drives the direction indication light in the flashing manner due to application of the voltage of the battery power supply to the direction indication light, as a result of the signal output by the control unit, wherein the control unit includes a power supply voltage detection unit that detects the voltage of the battery power supply, a pulse signal generation unit that generates the pulse signal, a flash signal generation unit that generates the flash signal and an AND logic operation unit based on the AND logic of the pulse signal and the flash signal, and the duty ratio is one hundred percent when the voltage of the battery power supply is equal to or below a predetermined voltage, and the duty ratio is set so as to become smaller in a step-like manner as the voltage of the battery power supply increases above the predetermined voltage.

4. A control unit for a vehicle direction indication device that drives a direction indication light, the control unit for detecting a battery power supply voltage and outputting a signal generated by pulse width modulating a flash signal for driving the direction indication light with a duty ratio based upon the detected battery power supply voltage, the duty ratio decreasing in a stepwise manner over respective predetermined ranges of detected voltage values as the detected battery power supply voltage increases.

5. The control unit according to claim 4, wherein the duty ratio is one hundred percent when the detected battery power supply voltage is equal to or below a predetermined voltage.

* * * * *